(12) United States Patent
Jegal et al.

(10) Patent No.: US 11,489,191 B2
(45) Date of Patent: Nov. 1, 2022

(54) CONTINUOUS MANUFACTURING METHOD OF LITHIUM RECHARGEABLE BATTERY FORMING PASSIVE FILM ON SURFACE OF LITHIUM METAL ELECTRODE AND LITHIUM RECHARGEABLE BATTERY MANUFACTURED THEREFROM

(71) Applicant: LG CHEM, LTD., Seoul (KR)

(72) Inventors: Jongpil Jegal, Daejeon (KR); Hyunjun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 253 days.

(21) Appl. No.: 16/603,893

(22) PCT Filed: Dec. 14, 2018

(86) PCT No.: PCT/KR2018/015931
§ 371 (c)(1),
(2) Date: Oct. 9, 2019

(87) PCT Pub. No.: WO2019/117669
PCT Pub. Date: Jun. 20, 2019

(65) Prior Publication Data
US 2020/0119393 A1    Apr. 16, 2020

(30) Foreign Application Priority Data

Dec. 14, 2017  (KR) .................. 10-2017-0172275
Dec. 13, 2018  (KR) .................. 10-2018-0161296

(51) Int. Cl.
*H01M 10/0525* (2010.01)
*H01M 10/0567* (2010.01)
(Continued)

(52) U.S. Cl.
CPC ..... *H01M 10/0525* (2013.01); *H01M 4/0409* (2013.01); *H01M 4/13915* (2013.01);
(Continued)

(58) Field of Classification Search
CPC .......... H01M 10/052; H01M 10/0525; H01M 10/0567; H01M 2004/027;
(Continued)

(56) References Cited

U.S. PATENT DOCUMENTS 4,824,746 A *  4/1989  Belanger ............... H01M 4/806
                                                          429/231.6
6,495,287 B1  12/2002  Kolb et al.
(Continued)

FOREIGN PATENT DOCUMENTS

CN        102082288 A    6/2011
CN        105684208 A    6/2016
(Continued)

OTHER PUBLICATIONS

International Search Report issued in corresponding International Patent Application No. PCT/KR2018/015931, dated Apr. 4, 2019.

*Primary Examiner* — Carlos Barcena
(74) *Attorney, Agent, or Firm* — Morgan, Lewis & Bockius LLP

(57) ABSTRACT

The present invention provides a manufacturing method of a lithium rechargeable battery, including (i) preparing a lithium metal electrode in which metal lithium (Li) is formed on one surface or both surfaces of a current collector; (ii) applying an electrolyte solution for coating including one or more lithium salts, one or more non-aqueous organic solvents, and one or more additives on a surface of the metal lithium to form a passive film which is a stable coat; (iii) manufacturing an electrode assembly including the lithium metal electrode as a negative electrode; and (iv) housing the electrode assembly in a rechargeable battery case and injecting an electrolyte solution for injection including one or more lithium salts, one or more non-aqueous organic solvents, and one or more additives to manufacture a rechargeable battery.

19 Claims, 2 Drawing Sheets

(51) Int. Cl.
  *H01M 4/66* (2006.01)
  *H01M 4/04* (2006.01)
  *H01M 4/13915* (2010.01)
  *H01M 4/02* (2006.01)

(52) U.S. Cl.
  CPC ....... *H01M 4/661* (2013.01); *H01M 10/0567* (2013.01); *H01M 2004/027* (2013.01); *H01M 2004/028* (2013.01)

(58) Field of Classification Search
  CPC ......... H01M 2004/028; H01M 4/0409; H01M 4/134; H01M 4/13915; H01M 4/1395; H01M 4/366; H01M 4/382; H01M 4/661
  See application file for complete search history.

(56) References Cited

U.S. PATENT DOCUMENTS

| | | |
|---|---|---|
| 6,613,475 B2 | 9/2003 | Fauteux et al. |
| 10,020,490 B2 | 7/2018 | Wegner et al. |
| 10,263,293 B2 | 4/2019 | Yu et al. |
| 2004/0185347 A1 | 9/2004 | Kim et al. |
| 2016/0141596 A1 | 5/2016 | Uhm et al. |
| 2016/0254572 A1* | 9/2016 | Yu ....................... H01M 10/058 429/126 |

FOREIGN PATENT DOCUMENTS

| | | |
|---|---|---|
| CN | 107068971 A | 8/2017 |
| JP | 2000-353546 A | 12/2000 |
| JP | 4383782 B2 | 12/2009 |
| KR | 10-2004-0071510 A | 8/2004 |
| KR | 10-2009-0055224 A | 6/2009 |
| KR | 10-2012-0096439 A | 8/2012 |
| KR | 10-2014-0000233 A | 1/2014 |
| KR | 10-2014-0089450 A | 7/2014 |
| KR | 10-2014-0125970 A | 10/2014 |
| KR | 10-2015-0014676 A | 2/2015 |
| KR | 10-2015-0051557 A | 5/2015 |
| KR | 10-2016-0038735 A | 4/2016 |
| TW | 20060713 A | 2/2006 |

* cited by examiner

CONTINUOUS MANUFACTURING METHOD OF LITHIUM RECHARGEABLE BATTERY FORMING PASSIVE FILM ON SURFACE OF LITHIUM METAL ELECTRODE AND LITHIUM RECHARGEABLE BATTERY MANUFACTURED THEREFROM

CROSS-REFERENCE TO RELATED APPLICATION

This application claims priority to and the benefit of Korean Patent Application No. 10-2017-0172275 filed in the Korean Intellectual Property Office on Dec. 14, 2017 and Korean Patent Application No. 10-2018-0161296 filed in the Korean Intellectual Property Office on Dec. 13, 2018, the entire contents of which are incorporated herein by reference.

TECHNICAL FIELD

The present invention relates to a continuous manufacturing method of a lithium rechargeable battery forming a passive film on a surface of lithium metal electrode, and more particularly, to a method of applying an electrolyte solution on a lithium metal electrode before assembling a lithium rechargeable battery to form a passive film and then manufacturing an electrode assembly and the lithium rechargeable battery, and a lithium rechargeable battery manufactured by the manufacturing method.

BACKGROUND ART

As technology development and a demand for mobile devices are increased, a demand for a rechargeable battery as an energy source is rapidly increasing, and among the rechargeable batteries, a lithium rechargeable battery having high energy density and voltage, a long cycle life and a low self-discharge rate is commercialized and widely used.

In general, a lithium rechargeable battery has a structure in which an electrode assembly including a positive electrode, a negative electrode, and a separator interposed between the positive electrode and the negative electrode is laminated or wound and is housed in a battery case, and is configured by injecting a non-aqueous electrolyte solution thereinto.

Here, as the negative electrode, a carbon-based material having high stability has been mainly used. However, despite problems due to very high chemical activity, with recent steady increase in the use of mobile communications and portable electronic devices and rapid development thereof, a demand for development of a rechargeable battery having high energy density is continuously increasing. Thus, with properties of low density (0.54 $g/cm^3$) and very low standard reduction potential (−3.045 V SHE: standard hydrogen electrode), there is still a growing need for lithium metal as the most popular material as a negative material for a high-energy density battery.

Meanwhile, a manufacturing method of the lithium metal battery has been also progressed in accordance with a manufacturing method of a lithium ion battery using a carbon-based material to which manufacturing technology of a battery is accumulated. However, since the two batteries cause a difference in a formation step of a passive film having a decisive influence on a long life characteristic by the difference in the negative electrode material, a fundamental change of battery manufacturing technology is needed.

In the case of a conventional carbon electrode, the carbon electrode represents a potential near 0 V (vs. SHE) after injecting an electrolyte solution, and since the potential is higher than the reduction decomposition potential of an electrolyte solution solvent and an additive, the passive film by decomposition of the electrolyte solution solvent and the additive is not formed only by injection of the electrolyte solution. Therefore, in the case of a carbon electrode, formation of the passive film occurs by applying potential in a formation process, and at this time, an aging process is performed for 24 hours or more under the atmosphere at room temperature or high temperature (40-60° C.) so that the surface of the carbon electrode is uniformly impregnated with the electrolyte solution. Accordingly, in the case of using the carbon electrode, a coat is uniformly formed on the surface relatively well.

However, unlike the carbon electrode, a lithium metal electrode represents a potential near −3.04 V (vs. SHE) after injecting the electrolyte solution, and since the potential is lower than the reduction decomposition potential of the electrolyte solution solvent and the additive, the passive film by reduction decomposition of the electrolyte solution solvent and the additive is produced immediately by contact with lithium metal, almost simultaneously with injection of the electrolyte solution.

Accordingly, unlike an outer portion of the battery which is impregnated with the electrolyte solution immediately after injecting the electrolyte solution and forms the passive film, the inside of the battery is impregnated with the electrolyte solution after a certain period of aging simultaneously with formation of the passive film, thereby causing a difference in the physical properties such as components, thickness, and density of the passive film due to a sequential change between the inside and outside of the battery.

The difference in the physical properties of the passive film causes imbalance of current density during charging and discharging, resulting in local production and growth of a lithium dendrite, which is a main cause of a reduced metal battery life.

Thus, as a method for preventing the problem, introduction of a novel electrolyte solvent, an additive, and the like has been suggested, but the problem has not been fundamentally solved.

In addition, in the case of adding a plurality of additives as a method for solving the problem, there still remain problems to be solved, for example, among the additives, there are some additives which are good in terms of the characteristic of forming the passive film, but when a residual amount thereof remains in the electrolyte solution, leave components having a large side effect on subsequent battery performance, thereby degrading rechargeable battery performance.

Accordingly, there is currently a high need for technology to form a uniform passive film even on the surface of a lithium metal electrode, while preventing performance degradation of a lithium rechargeable battery.

DISCLOSURE

Technical Problem

The present invention has been made in an effort to provide a continuous manufacturing method of a lithium rechargeable battery having advantages of solving the problems of the conventional technology as described above and the technical object which has been requested from the past.

The inventors of the present application repeated extensive study and various experiments, and as a result, confirmed that in the case of first applying an electrolyte solution including an additive advantageous for the properties of a passive film on a lithium metal electrode to form the passive film, before assembling an electrode assembly and lithium rechargeable battery, and using the lithium metal electrode having the passive film formed thereon to manufacture an electrode assembly and a lithium rechargeable battery, a uniform passive film may be formed even on a surface of the lithium metal electrode, and degradation of lithium rechargeable battery performance may be prevented depending on the additive included in the electrolyte solution at the time of assembling the rechargeable battery, as described below, and completed the present invention.

Technical Solution

Accordingly, an exemplary embodiment of the present invention provides a manufacturing method of a lithium rechargeable battery including:

(i) preparing a lithium metal electrode in which metal lithium (Li) is formed on one surface or both surfaces of a current collector;

(ii) applying an electrolyte solution for coating including one or more lithium salts, one or more non-aqueous organic solvents, and one or more additives on a surface of the metal lithium to form a passive film which is a stable coat;

(iii) manufacturing an electrode assembly including a lithium metal electrode having the passive film formed thereon as a negative electrode; and (iv) housing the electrode assembly in a rechargeable battery case and injecting an electrolyte solution for injection including one or more lithium salts, one or more non-aqueous organic solvents, and one or more additives to manufacture a rechargeable battery;

wherein the additive of the electrolyte solution for coating is one or more selected from the group consisting of vinylene carbonate (VC), vinyl ethylene carbonate (VEC), fluoroethylene carbonate (FEC), propane sultone (PS), 1,3-propane sultone (PRS), ethylene sulfate (ESa), succinonitrile (SN), adiponitrile (AN), hexane tricarbonitrile (HTCN), gamma-butyrolactone (GBL), biphenyl (BP), cyclohexyl benzene (CHB), and tert-amyl benzene (TAB), the additive of the electrolyte solution for injection is one or more selected from the group consisting of pyridine, triethylphosphite, triethanolamine, cyclic ether, ethylene diamine, n-glyme, triamide hexaphosphate, nitrobenzene derivatives, sulfur, a quinone imine dye, N-substituted oxazolidinone, N,N-substituted imidazolidine, ethylene glycol dialkyl ether, ammonium salts, pyrrole, 2-methoxy ethanol, aluminum trichloride, carbon tetrachloride, trifluoroethylene, fluoroethylene carbonate (FEC), and propane sultone (PS), and an additive composition of the electrolyte solution for coating is different from an additive composition of the electrolyte solution for injection.

Here, the 'additive composition' refers to any one or more of contents and kinds of additives, and represents the cases where the kinds and/or contents of additives included in the electrolyte solution for coating are different from the kinds and/or contents of additives included in the electrolyte solution for injection, that is, a concept including all cases except the cases where the kinds and contents are the same, such as where the kinds of additives included in the electrolyte solution for coating and the kinds of additives included in the electrolyte solution for injection are different from each other, where the kinds of additives are the same, but the contents of additives are different from each other, where some kinds of additives are the same but other kinds of additives are different, or where the kinds of additives are the same, but the contents of some additives are different.

Therefore, according to the present invention, the composition of the electrolyte solution for coating which is applied on a lithium metal electrode to form a passive film may be optionally determined later, differently from the electrolyte solution for injection which is housed in a case during assembly of the battery, and an excellent effect may be exhibited therefrom in the formation of the passive film in the electrolyte solution for coating; however, since an additive such as the additive which may cause a problem when a residual amount thereof remains in the electrolyte solution used during operation of the rechargeable battery, may be used, the passive film having excellent quality may be formed. In addition, subsequently, this material is not included in the electrolyte solution for injection, thereby preventing performance degradation of the lithium rechargeable battery by the material.

As described above, the electrolyte solution for coating may include an additive which exerting advantageous characteristics in the formation of the passive film, and for example, may include the materials as described above, however, specifically, the additive may be one or more selected from the group consisting of succinonitrile (SN), adiponitrile (AN), hexane tricarbonitrile (HTCN), gamma-butyrolactone (GBL), propane sultone (PS), 1,3-propane sultone (PRS), vinylene carbonate (VC), and fluoroethylene carbonate (FEC), and more specifically the additive may be VC and FEC.

The materials of VC, SN, AN, HTCN, PS, PRS, GBL, and FEC cause a reduction decomposition reaction at a high potential relative to the solvent, in the formation of the passive film, thereby forming the passive film, and thus, when the materials are used as the composition of the passive film, an effect of suppressing a decomposition reaction of the solvent and forming a dense passive film may be exhibited. However, when FEC and VC are included in the electrolyte solution which is injected when assembling the lithium rechargeable battery, they have a problem of increasing swelling by gas produced during storage at high temperature even in the case that FEC remains in a large amount and VC remains in a trace amount.

Therefore, according to the present invention, the materials may be preferably included in the electrolyte solution for coating, and subsequently, may not be included or may be included in a small content in the electrolyte solution for injection.

Here, the additive may be included at 0.1 to 20 wt %, specifically 0.5 to 10 wt %, and more specifically 1 to 5 wt %, based on a total weight of the electrolyte solution for coating.

When the additive is included in a too small amount outside the range, a passive film having excellent traits may not be formed, and when the additive is included in a too large amount, the additive may act as resistance, which is thus not preferred.

Meanwhile, application of the electrolyte solution for coating may be performed by dip coating or roll to roll coating.

Here, the dip coating is a method of directly soaking a lithium metal electrode in which metal lithium (Li) is formed on one surface or both surfaces of a current collector in an electrolyte solution for coating.

Here, since the lithium metal electrode is continuously manufactured in a sheet form, the dip coating may be performed by designing the lithium metal electrode sheet to be passed through a water tank containing the electrolyte solution for coating, continuously with the manufacturing process of the lithium metal electrode.

The method is shown in FIG. 1.

Referring to FIG. 1, a lithium metal electrode 110 in which metal lithium 112 is formed on both surfaces of a copper current collector 111 is transferred in a sheet form by rolls 121, 122, and 123. Here, a second roll 122 is soaked in a water tank 130 filled with an electrolyte solution for coating 131 to apply the electrolyte solution for coating 131 on the lithium metal electrode 110 moving along the rolls 121, 122, and 123.

As another method, the roll to roll coating is a method in which the lithium metal electrode is not directly passed through the electrolyte solution, but a portion of the roll is slaked in the electrolyte solution for coating and the roll in the portion which is not soaked in the electrolyte solution is in contact with the lithium metal electrode, thereby indirectly applying the electrolyte solution on the roll on the lithium metal electrode.

The method is shown in FIG. 2.

Referring to FIG. 2, a lithium metal electrode 210 in which metal lithium 212 is formed on both surfaces of the copper current collector 211 is transferred in a sheet form by rolls 221, 222, and 223. Here, in water tanks 230 and 240 filled with electrolyte solutions for coating 231 and 241, coating rolls 224 and 225 for coating are disposed with one side of the rolls being soaked in electrolyte solutions 231 and 241 and the other side of the rolls being in contact with the lithium metal electrode 210.

Here, the electrolyte solutions for coating 231 and 241 are drawn by rotation of the coating rolls 224 and 225 and the electrolyte solutions for coating 231 and 241 on the coating rolls 224 and 225 may be applied on a surface of the lithium metal electrode 210.

By the process, the electrolyte solution for coating may be applied on one surface or both surfaces of the lithium metal electrode, and thus, the passive film is immediately produced on the surface of the lithium metal electrode by reduction decomposition of the solvent and the additive of the electrolyte solution for coating due to the characteristic thereof of low potential. Therefore, the number of applications of the electrolyte solution is not limited, and the application may be performed at least once, and thus, the passive film having a multi-layered structure to a desired degree may be formed.

Here, the passive film may be a solid electrolyte interphase (SEI) coat.

The inventors of the present application found that according to the manufacturing method, the electrolyte solution for coating may be set with a condition advantageous only for coat formation, separately from the electrolyte solution for injection which is subsequently injected at the time of assembling the rechargeable battery, thereby capable of forming the passive film having excellent traits and thus, non-uniform production and growth of a lithium dendrite are suppressed, thereby capable of manufacturing a lithium rechargeable battery which has high charge and discharge efficiency and represents an excellent life characteristic. In addition, it was confirmed that minimal additives are added to the electrolyte solution for injection, thereby solving the problem of degradation of rechargeable battery performance which may be problematic later.

The electrolyte solution for injection may include one or more lithium salts, one or more non-aqueous electrolyte solutions, and one or more additives, except that the additive composition is different from that of the electrolyte solution for coating, as described above.

That is, as described above, the electrolyte solution for injection does not include an additive which has a condition advantageous for formation of the passive film, but may cause degradation of rechargeable battery performance when a residual amount of the additive remains during operation of the rechargeable battery, and may include the kind of additives which may exert advantageous effects during operation of the rechargeable battery.

For example, the electrolyte solution for injection may include additives for improving charge and discharge characteristics, flame retardancy, or the like, and for example, may include the above materials, and specifically, may include one or more selected from the group consisting of fluoroethylene carbonate (FEC) and propane sultone (PS).

When the fluoroethylene carbonate (FEC) is included in an appropriate content, the battery performance is not degraded, and rather, FEC is preferred, since it acts as a preferred coat forming agent for battery operation to have an effect of improving a life characteristic, and the propane sulfone (PS) is preferred, since it suppresses a side reaction which occurs in the positive electrode during storage at high temperature, thereby improving a high temperature storage characteristic.

However, as omitted from the example of the additives for injection, a material such as vinylene carbonate (VC) deteriorates a high temperature storage characteristic by remaining in a trace amount, and thus, is not included in the electrolyte solution for injection.

The additive included in the electrolyte solution for injection may be included at 0.1 to 10 wt %, specifically 0.5 to 7 wt %, and more specifically 0.5 to 5 wt %, based on the total weight of the electrolyte solution for injection.

When the additive is included in a too large content outside the range, the additive may act as resistance or even affect the high temperature storage characteristic, which is thus not preferred, and when the additive is included in a too small content, improved characteristics which may be exhibited by inclusion of the additive, for example, improved life characteristic and high temperature storage characteristic may not be expected, which is also not preferred.

Meanwhile, the electrolyte solution for coating and the electrolyte solution for injection include one or more lithium salts and one or more non-aqueous organic solvents, and the compositions thereof may be the same as or different from each other, and may be appropriately selected from the following examples.

The lithium salt is a material which is readily dissolved in the non-aqueous electrolyte solution, and as the lithium salt, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, lithium 4-phenyl borate, imide, or the like may be used.

As the non-aqueous organic solvent, for example, aprotic organic solvents such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, formic acid methyl, acetic acidmethyl, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, or the like may be used.

Hereinafter, other constituent elements will be described.

The lithium metal electrode may be manufactured by depositing metal lithium or rolling a lithium foil on one surface or both surfaces of a current collector in a flat surface form. Here, the current collector may be specifically a copper foil.

The copper foil may be generally manufactured at a thickness of 3 to 50 μm, and the metal lithium formed on the copper foil may be formed at a thickness of for example, 1 to 300 μm.

The electrode assembly may be manufactured by including a negative electrode which is the lithium metal electrode having the passive film formed thereon, a positive electrode, and a separator interposed between the negative electrode and the positive electrode.

Here, a structure of the electrode assembly is not limited, and the electrode assembly may be a laminate type electrode assembly in which the positive electrode, the separator, and the negative electrode are stamped to a unit electrode and laminated, a jelly-roll type electrode assembly in which the positive electrode, the separator, and a negative electrode sheet are laminated and wound, or a stack and folding type electrode assembly in which the unit electrode is arranged on a separator film in a sheet form and wound.

The positive electrode may include all of the conventional manufacturing method and constituent elements of a positive electrode.

Specifically, the positive electrode may be manufactured by applying a mixture of a positive electrode active material, a conductive material, and a binder on a positive electrode current collector and drying the mixture, and if necessary, a filler may be further added to the mixture.

The positive electrode current collector is generally manufactured at thickness of 3 to 500 μm. The positive electrode current collector and an extended current collector part are not particularly limited as long as they do not cause a chemical change in the battery and have high conductivity, and for example, stainless steel, aluminum, nickel, titanium, sintered carbon, or aluminum or stainless steel which are surface-treated with carbon, nickel, titanium, silver, or the like, and the like may be used. The positive electrode current collector and the extended current collector part may have fine protrusions and depressions formed on the surface to increase adherence of the positive electrode active material, and may be formed into various forms such as a film, a sheet, foil, net, a porous body, foam, and a non-woven fabric body.

The positive electrode active material may include layered compounds such as lithium cobalt oxide ($LiCoO_2$) and lithium nickel oxide ($LiNiO_2$) or the compounds substituted with one or more transition metals; lithium manganese oxides represented by a chemical formula of $Li_{1+x}Mn_{2-x}O_4$ (wherein x is 0-0.33), $LiMnO_3$, $LiMn_2O_3$, or $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni site type lithium nickel oxides represented by a chemical formula of $LiNi_{1-x}M_xO_2$ (wherein M=Co, Mn, Al, Cu, Fe, Mg, B or Ga, and x=0.01-0.3); lithium manganese composite oxides represented by a chemical formula of $LiMn_{2-x}M_xO_2$ (wherein M=Co, Ni, Fe, Cr, Zn, or Ta, and x=0.01-0.1) or $Li_2Mn_3MO_8$ (wherein M=Fe, Co, Ni, Cu, or Zn); $LiMn_2O_4$ in which some of Li of the chemical formula is substituted with an alkaline-earth metal ion; disulfide compounds; $Fe_2(MoO_4)_3$, lithium metal phosphate compounds represented by a chemical formula of $LiFe_xMn_yCo_zPO_4$ (wherein x, y, z≥0, and x+y+z=1), but not limited thereto.

The conductive material is usually added at 1 to 30 wt %, based on a total weight of a mixture including the positive electrode active material. The conductive material is not particularly limited as long as it does not cause a chemical change in the battery and has conductivity, and for example, graphite such as natural graphite or artificial graphite; carbon black such as carbon black, acetylene black, ketjen black, channel black, furnace black, lamp black, or summer black; conductive fiber such as carbon fiber or metal fiber; metal powder such as fluorocarbon, aluminum, or nickel powder; conductive whisky such as zinc oxide or potassium titanate; conductive metal oxides such as titanium oxide; conductive materials such as polyphenylene derivatives, or the like may be used.

The binder is a component assisting combination of an active material and a conductive material and the like and combination of a current collector, and is usually added at 1 to 30 wt %, based on a total weight of the mixture including the positive electrode active material. An example of the binder may include polyfluorovinylidene, polyvinylalcohol, carboxylmethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and the like.

The filler is a component suppressing expansion of the positive electrode and selectively used, and is not particularly limited as long as it does not cause a chemical change in the battery and is a fibrous material, and for example, olefinic polymers such as polyethylene and polypropylene; and fibrous materials such as glass fiber and carbon fiber may be used.

The separator is interposed between the positive electrode and the negative electrode, and an insulating thin membrane having high ion permeability and mechanical strength is used. A pore diameter of the separator is generally 0.01-10 μm, and the thickness is generally 5-300 μm. As the separator, for example, olefinic polymers such as chemical resistant and hydrophobic polypropylene; a sheet or non-woven fabric made of glass fiber, polyethylene, or the like, and the like are used, and a separator made of the fabric on the surface of which ceramic, a binder, or a mixed layer of the ceramic and the binder is coated may be used. When a solid electrolyte such as a polymer is used as the electrolyte, the solid electrolyte may be also used as the separator.

The thus-manufactured electrode assembly is housed in a rechargeable battery case, and the rechargeable battery case may be a pouch type battery case composed of an aluminum laminate sheet, or a square or cylindrical battery case composed of a metal can.

After the electrode assembly is housed in the rechargeable battery case, the electrolyte solution for injection may be injected through an injection port.

The present invention provides the lithium rechargeable battery manufactured by the method, and specifically, the lithium rechargeable battery according to the method may include the lithium metal electrode in which the passive film having a composition according to the decomposition of the electrolyte solution for coating is uniformly formed on the surface of the electrode in which metal lithium is formed on one surface or both surfaces of a current collector.

MODE FOR INVENTION

Hereinafter, the present invention will be described referring to the Examples according to the present invention, which is however for better understanding of the present invention, and the scope of the present invention is not limited thereto.

Example 1

Figure 1:
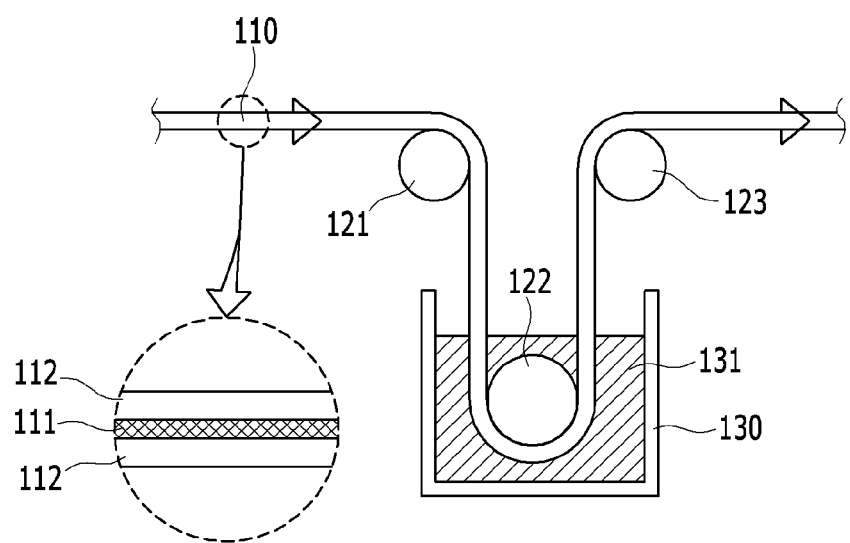
FIG. 1 is a schematic view of a method of applying an electrolyte solution for coating according to an exemplary embodiment of the present invention.

Metal lithium (thickness: 20 μm) was rolled on a current collector (thickness: 10 μm) composed of copper to manufacture a lithium metal negative electrode sheet. The lithium metal negative electrode sheet was soaked in an electrolyte solution for coating by the method shown in FIG. 1 to form a passive film on the surface. Here, as the composition of the electrolyte solution for coating, a liquid electrolyte solution of 1 M $LiPF_6$ dissolved in a mixed solvent of ethylene carbonate, dimethylene carbonate, diethyl carbonate at 1:2:1 including FEC and VC as an additive at 10 wt % and 2 wt %, respectively was used.

The lithium metal negative electrode was stamped and used as the negative electrode.

A Co precursor and $Li_2CO_3$ were mixed and sintered in a furnace at a temperature of 940° C. for 10 hours to prepare $LiCoO_2$ which was used as a positive electrode active material, and PVdF as a binder and Super-P as a conductive material were used. The positive electrode active material, the binder, and the conductive material were mixed well in NMP so that the weight ratio is 95:2.5:2.5, and the mixture was applied (a loading amount: 4 $mAh/cm^2$) on an Al foil having a thickness of 12 μm, dried at 130° C., and rolled so that an electrode porosity is 30%, thereby manufacturing a positive electrode.

The positive electrode, the negative electrode, a polyethylene film (Celgard, thickness: 12 μm) as a separator, and a liquid electrolyte solution of 1 M $LiPF_6$ dissolved in a mixed solvent of ethylene carbonate, dimethylene carbonate, and diethyl carbonate at 1:2:1 including FEC and PS as an additive at 5 wt % and 2 wt %, respectively as an electrolyte solution for injection were used, and housed in a pouch type case, thereby manufacturing rechargeable batteries.

Example 2

Figure 2:
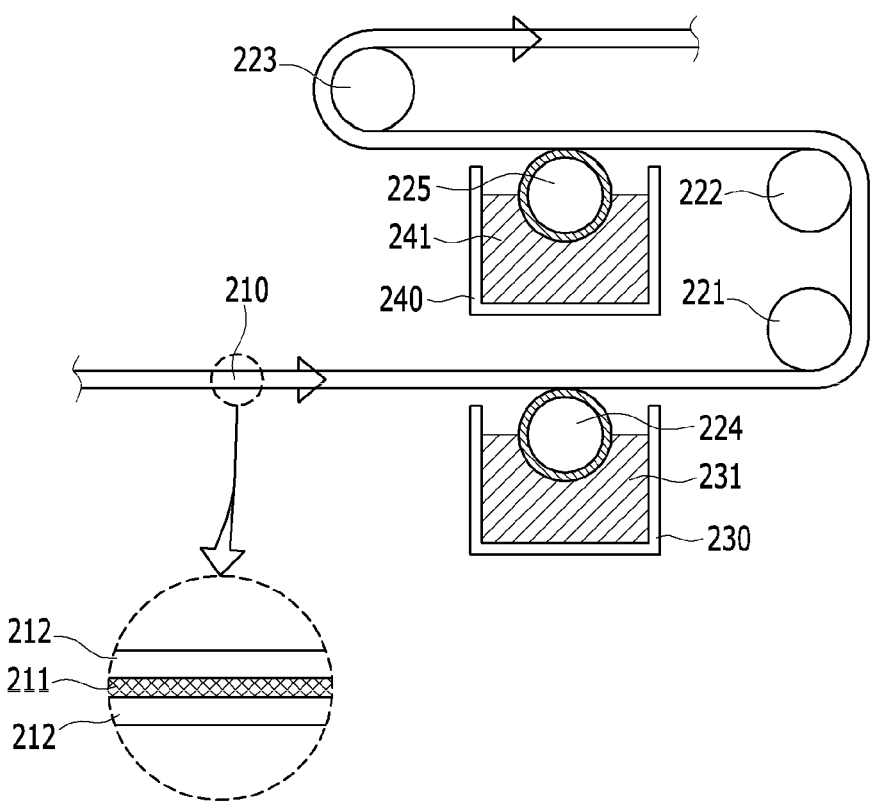
FIG. 2 is a schematic view of a method of applying an electrolyte solution for coating according to another exemplary embodiment of the present invention.

The lithium rechargeable battery was manufactured in the same manner as in Example 1, except that the passive film was formed on the lithium metal negative electrode sheet by the method shown in FIG. 2, and as the composition of the electrolyte solution for coating, a liquid electrolyte solution of 1 M $LiPF_6$ dissolved in a mixed solvent of ethylene carbonate, dimethylene carbonate, and diethyl carbonate at 1:2:1 including FEC and VC as an additive at 10 wt % and 2 wt %, respectively was used.

Comparative Example 1

The lithium rechargeable battery was manufactured in the same manner as in Example 1, except that the lithium metal sheet having no passive film formed thereon was stamped and used as the negative electrode.

Comparative Example 2

The lithium rechargeable battery was manufactured in the same manner as in Example 1, except that as the composition of the electrolyte solution for injection, a liquid electrolyte solution of 1 M $LiPF_6$ dissolved in a mixed solvent of ethylene carbonate, dimethylene carbonate, and diethyl carbonate at 1:2:1 without an additive was used.

Comparative Example 3

The lithium rechargeable battery was manufactured in the same manner as in Example 1, except that the lithium metal sheet having no passive film formed thereon was stamped and used as the negative electrode, and as the electrolyte solution for injection, a liquid electrolyte solution of 1 M $LiPF_6$ dissolved in a mixed solvent of ethylene carbonate, dimethylene carbonate, and diethyl carbonate at 1:2:1 including FEC, VC, and PS as an additive at 10 wt %, 2 wt %, and 2 wt %, respectively was used.

Comparative Example 4

The lithium rechargeable battery was manufactured in the same manner as in Example 1, except that as the composition of the electrolyte solution for injection, a liquid electrolyte solution of 1 M $LiPF_6$ dissolved in a mixed solvent of ethylene carbonate, dimethylene carbonate, and diethyl carbonate at 1:2:1 including VC as an additive at 2 wt % was used.

Experimental Example 1

The rechargeable batteries manufactured according to Examples 1 and 2 and Comparative Example 1 were charged and discharged twice at 0.2 C in a range of 3 V-4.3 V, thereby measuring an initial discharge capacity and discharge efficiency, and the results are shown in the following Table 1. Thereafter, charge at 0.1 C and discharge at 0.5 C were performed 100 times and a discharge capacity for 100 times relative to a discharge capacity for once and a retention ratio were calculated, and the results are shown in the following Table 1.

TABLE 1

| | Discharge capacity/ discharge efficiency | 100 times (%) |
|---|---|---|
| Example 1 | 1174 mAh, 99.95% | 1033 mAh (87%) |
| Example 2 | 1172 mAh, 99.94% | 1020 mAh (87%) |
| Comparative Example 1 | 1178 mAh, 99.88% | 233 mAh (20%) |
| Comparative Example 2 | 1174 mAh, 99.93% | 0 mAh (0%) |

Referring to Table 1, it was confirmed that the lithium rechargeable battery manufactured by forming the passive film on the lithium metal electrode according to the present invention suppressed non-uniform production and growth of a lithium dendrite, and thus, improved charge and discharge efficiency, thereby improving a life characteristic of a battery, while the lithium rechargeable battery which had no passive film previously formed thereon or the lithium rechargeable battery which had the passive film formed thereon but used no additive in the electrolyte solution for injection had a significantly reduced life characteristic.

Experimental Example 2

The rechargeable batteries manufactured according to Examples 1 and 2 and Comparative Examples 2 to 4 were charged and discharged at 0.2 C in a range of 3 V-4.3 V and the capacities were confirmed, and then the rechargeable batteries were recharged at 0.2 C to 4.3 V and left at a temperature of 60° C. for 21 days. The thicknesses and the swelling ratios were measured and the results are shown in the following Table 2.

TABLE 2

|  | Initial thickness (mm) | Thickness after 21 days (mm) | Swelling ratio (%) |
|---|---|---|---|
| Example 1 | 2.78 | 2.96 | 6.5 |
| Example 2 | 2.77 | 2.97 | 7.2 |
| Comparative Example 3 | 2.79 | 3.27 | 17.2 |
| Comparative Example 4 | 2.77 | 3.58 | 29.2 |

Referring to Table 2, it was confirmed that in the Examples in which the passive film was formed using an additive allowing the characteristics of the passive film to be excellent and then the additive is not included in the electrolyte solution for injection, a swelling problem which may cause a problem during high temperature storage of the lithium rechargeable battery was solved, while in Comparative Examples 3 and 4 in which the additive such as VC for forming the passive film having excellent properties is included in the electrolyte solution for injection, the swelling problem during high temperature storage was serious due to gas production by a residual amount of additive.

A person having ordinary knowledge in the art to which the present invention pertains may conduct various applications and modifications within the scope of the present invention, based on the above descriptions.

INDUSTRIAL APPLICABILITY

As described above, the manufacturing method of a lithium rechargeable battery according to the present invention includes first applying an electrolyte solution for coating including an additive advantageous for the characteristics of the passive film on a lithium metal electrode to form the passive film, before assembling an electrode assembly and the lithium rechargeable battery, and using the lithium metal electrode having the passive film formed thereon to manufacture the electrode assembly and the lithium rechargeable battery, thereby capable of forming the uniform passive film on a surface of the lithium metal electrode. Thus, non-uniform production and growth of the lithium dendrite of the manufactured lithium rechargeable battery are suppressed, and accordingly, charge and discharge efficiency is improved, thereby having an effect of contributing to improvement of a battery life.

Moreover, the additive which may cause a problem during operation of the lithium rechargeable battery is not included in the electrolyte solution for injection, thereby preventing degradation of lithium rechargeable battery performance.

The invention claimed is:

1. A method of manufacturing a lithium rechargeable battery, comprising:
   (i) preparing a lithium metal electrode in which lithium metal (Li) is formed on one surface or both surfaces of a current collector;
   (ii) applying an electrolyte coating solution on a surface of the lithium metal without applying any electric potential to form a passive film which is a stable coat, where the electrolyte coating solution includes one or more lithium salts for coating, one or more non-aqueous organic solvents for coating, and additives for coating;
   (iii) manufacturing an electrode assembly including the lithium metal electrode having the passive film formed thereon as a negative electrode; and
   (iv) housing the electrode assembly in a rechargeable battery case and injecting an electrolyte injection solution to manufacture a rechargeable battery, where the electrolyte injection solution includes one or more lithium salts for injection, one or more non-aqueous organic solvents for injection, and one or more additives for injection;

wherein:
   the additives for coating cause a reductive decomposition reaction at the higher potential than the non-aqueous organic solvents for coating, and comprise fluoroethylene carbonate (FEC), and one or more selected from the group consisting of vinylene carbonate (VC), propane sultone (PS), 1,3-propane sultone (PRS), succinonitrile (SN), adiponitrile (AN), hexane tricarbonitrile (HTCN), and gamma-butyrolactone (GBL),
   the additives for injection comprise one or more selected from the group consisting of pyridine, triethylphosphite, triethanolamine, cyclic ether, ethylene diamine, n-glyme, triamide hexaphosphate, nitrobenzene derivatives, sulfur, a quinone imine dye, N-substituted oxazolidinone, N,N-substituted imidazolidine, ethylene glycol dialkyl ether, ammonium salts, pyrrole, 2-methoxy ethanol, aluminum trichloride, carbon tetrachloride, trifluoroethylene, fluoroethylene carbonate (FEC), and propane sultone (PS), and
   an additive composition consisting of the additives for coating is different from an additive composition consisting of the additives for injection.

2. The method of manufacturing a lithium rechargeable battery of claim 1, wherein the additive composition consisting of the additives for coating comprises one or more different additives from the additives included in the additive composition consisting of the additives for injection, or an amount of one or more of the additives included in the additive composition consisting of the additives for coating is different from an amount of one or more of the additives included in the additive composition consisting of the additives for injection.

3. The method of manufacturing a lithium rechargeable battery of claim 1, wherein the current collector comprises a copper foil.

4. The method of manufacturing a lithium rechargeable battery of claim 1, wherein the lithium metal is formed on the one surface or both surfaces of the current collector by deposition or rolling.

5. The method of manufacturing a lithium rechargeable battery of claim 1, wherein the additive for coating comprises vinylene carbonate (VC) and fluoroethylene carbonate (FEC).

6. The method of manufacturing a lithium rechargeable battery of claim 1, wherein the additive for coating is included in the electrolyte solution for coating at 0.1 to 20 wt %, based on a total weight of the electrolyte solution for coating.

7. The method of manufacturing a lithium rechargeable battery of claim 1, wherein the applying of the electrolyte coating solution is performed by dip coating or roll to roll coating.

8. The method of manufacturing a lithium rechargeable battery of claim 1, wherein the applying of the electrolyte coating solution is performed at least once.

9. The method of manufacturing a lithium rechargeable battery of claim 1, wherein the passive film comprises a solid electrolyte interphase (SEI) coat.

10. The method of manufacturing a lithium rechargeable battery of claim 1, wherein the electrode assembly includes a negative electrode which is the lithium metal electrode having the passive film formed thereon, a positive electrode, and a separator interposed between the negative electrode and the positive electrode.

11. The method of manufacturing a lithium rechargeable battery of claim 1, wherein the additive for injection is one or more selected from the group consisting of fluoroethylene carbonate (FEC) and propane sultone (PS).

12. The method of manufacturing a lithium rechargeable battery of claim 1, wherein the additive for injection is included in the electrolyte injection solution in an amount of 0.1 to 10 wt %, based on a total weight of the electrolyte injection solution.

13. The method of manufacturing a lithium rechargeable battery of claim 1, wherein the lithium metal electrode is continuously manufactured in a sheet form.

14. The method of manufacturing a lithium rechargeable battery of claim 1, wherein the additive for coating is included in the electrolyte coating solution in an amount of at 0.5 to 10 wt %, based on a total weight of the electrolyte injection solution.

15. The method of manufacturing a lithium rechargeable battery of claim 1, wherein the additive for coating is included in the electrolyte coating solution in an amount of at 1 to 5 wt %, based on a total weight of the electrolyte injection solution.

16. The method of manufacturing a lithium rechargeable battery of claim 1, wherein the additive for injection is included in the electrolyte injection solution in an amount of at 0.5 to 7 wt %, based on a total weight of the electrolyte injection solution.

17. The method of manufacturing a lithium rechargeable battery of claim 1, wherein the additive for injection is included in the electrolyte injection solution in an amount of at 0.5 to 5 wt %, based on a total weight of the electrolyte injection solution.

18. The method of manufacturing a lithium rechargeable battery of claim 1, wherein the lithium salts for coating and the lithium salts for injection independently comprise one or more selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, aliphatic lithium carbonate, lithium 4-phenyl borate, and imide.

19. The method of manufacturing a lithium rechargeable battery of claim 1, wherein the non-aqueous organic solvent for coating and the non-aqueous organic solvent for injection independently comprise one or more selected from the group consisting of aprotic organic solvents such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, formic acid methyl, acetic acidmethyl, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

\* \* \* \* \*